US012645612B2

(12) United States Patent
Petri et al.

(10) Patent No.: US 12,645,612 B2
(45) Date of Patent: Jun. 2, 2026

(54) METHODS AND APPARATUS FOR COMMUNICATION BETWEEN PROCESSING CIRCUITRY AND A PERIPHERAL DEVICE

(71) Applicant: Arm Limited, Cambridge (GB)

(72) Inventors: Gustavo Federico Petri, Cambridge (GB); Guilhem Floréal Bryant, Cambridge (GB); Nicholas Costas Spinale, Cambridge (GB); Dominic Phillip Mulligan, Cambridge (GB)

(73) Assignee: Arm Limited, Cambridge (GB)

( * ) Notice: Subject to any disclaimer, the term of this patent is extended or adjusted under 35 U.S.C. 154(b) by 277 days.

(21) Appl. No.: 18/249,194

(22) PCT Filed: Aug. 26, 2021

(86) PCT No.: PCT/GB2021/052220
§ 371 (c)(1),
(2) Date: Apr. 14, 2023

(87) PCT Pub. No.: WO2022/084643
PCT Pub. Date: Apr. 28, 2022

(65) Prior Publication Data
US 2023/0385207 A1 Nov. 30, 2023

(30) Foreign Application Priority Data
Oct. 21, 2020 (GB) ...................................... 2016674

(51) Int. Cl.
*G06F 13/10* (2006.01)
*G06F 21/44* (2013.01)

(52) U.S. Cl.
CPC ............ *G06F 13/102* (2013.01); *G06F 21/44* (2013.01)

(58) Field of Classification Search
CPC ........ G06F 13/102; G06F 21/44; G06F 21/57; G06F 2221/2141; G06F 21/82; G06F 21/70
See application file for complete search history.

(56) References Cited

U.S. PATENT DOCUMENTS

2013/0159704 A1* 6/2013 Chandrasekaran ..... G06F 21/57
713/155
2014/0157349 A1* 6/2014 Robinson ................ H04L 67/54
726/1

(Continued)

OTHER PUBLICATIONS

Pascal Nasahl, et al., "Hector-V: A Heterogeneous CPU Architecture for a Secure RISC-V Execution Environment", Arxiv.org, Cornell University Library, 201 Olin Library Cornell University Ithaca, NY 14853, Sep. 11, 2020 (Sep. 11, 2020), XP081760303, section 4.2.1 and 5.2.

(Continued)

*Primary Examiner* — Khalid M Almaghayreh
(74) *Attorney, Agent, or Firm* — NIXON & VANDERHYE P.C.

(57) ABSTRACT

An apparatus comprises interface circuitry to interface with one or more peripheral devices, processing circuitry to execute software to communicate with a given peripheral device of the one or more peripheral devices, trusted execution environment circuitry communicatively coupled to the interface circuitry and the processing circuitry. The trusted execution circuitry is configured to: receive a transmission from one of the processing circuitry and the given peripheral device to the other one of the processing circuitry and the given peripheral device; and apply a control policy in respect of the received transmission and, based on the control policy, determine whether to forward the received transmission to said other one of the processing circuitry and the given peripheral device.

16 Claims, 4 Drawing Sheets

(56) References Cited

U.S. PATENT DOCUMENTS

| | | | |
|---|---|---|---|
| 2014/0331279 A1* | 11/2014 | Aissi ....................... | G06F 21/57 |
| | | | 726/1 |
| 2019/0049912 A1* | 2/2019 | Poornachandran ... | G06F 30/343 |
| 2019/0089527 A1* | 3/2019 | Chandrasekaran ..... | H04L 9/083 |
| 2019/0132136 A1* | 5/2019 | Scarlata ................ | H04L 41/046 |
| 2019/0253398 A1* | 8/2019 | Sun ..................... | G06F 21/6263 |
| 2019/0266330 A1* | 8/2019 | Thaler, III ............ | G06F 21/554 |

OTHER PUBLICATIONS

"Secure Containers in Android: The Samsung KNOX Case Study" https://dl.acm.org/citation.cfm?id=2994470.
"Trubi: A system for dynamically constraining mobile devices within restrictive usage scenarios" https://dl.acm.org/citation.cfm?id=3084066.
"SeCloak: ARM Trustzone-based Mobile Peripheral Control" https://dl.acm.org/citation.cfm?id=3210334.
Examination Report for GB Application No. 2016674.0 dated Apr. 24, 2023, 6 pages.

* cited by examiner

METHODS AND APPARATUS FOR COMMUNICATION BETWEEN PROCESSING CIRCUITRY AND A PERIPHERAL DEVICE

The presented technique relates to the field of processing circuitry. More particularly, it relates to communications between processing circuitry and peripheral devices.

It is frequently desirable for processing circuitry to communicate with peripheral devices, such as devices for interacting with a user (such as a keyboard, mouse, or monitor) or for interacting with other devices (such as circuitry providing access to a network). Policies may be applied in respect of such communications, for example to restrict the actions which the processing circuitry is permitted to direct a given peripheral to perform, or the actions which the peripheral is permitted to direct the processing circuitry to perform. As another example, where the peripheral is a communication device such as an interface to a network, policies may be applied to control network dataflow (for example functioning as a firewall).

It would be desirable to improve the reliability and security of the implementation of such policies.

In one example configuration, there is provided an apparatus comprising:

interface circuitry to interface with one or more peripheral devices;

processing circuitry to execute software to communicate with a given peripheral device of the one or more peripheral devices; and trusted execution environment circuitry communicatively coupled to the interface circuitry and the processing circuitry, the trusted execution circuitry being configured to:

receive a transmission from one of the processing circuitry and the given peripheral device to the other one of the processing circuitry and the given peripheral device; and apply a control policy in respect of the received transmission and, based on the control policy, determine whether to forward the received transmission to said other one of the processing circuitry and the given peripheral device.

In a second example configuration, there is provided a method comprising:

receiving a transmission, from one of processing circuitry and a peripheral device, to the other one of the processing circuitry and the peripheral device;

applying a control policy in respect of the received transmission; and based on the control policy, determining whether to forward the received transmission to said other one of the processing circuitry and the given peripheral device.

In a third example configuration, there is provided a system comprising:

an apparatus as described above; and said one or more peripheral devices.

The present technique will be described further, by way of illustration only, with reference to examples thereof as illustrated in the accompanying drawings, in which.

Figure 1:
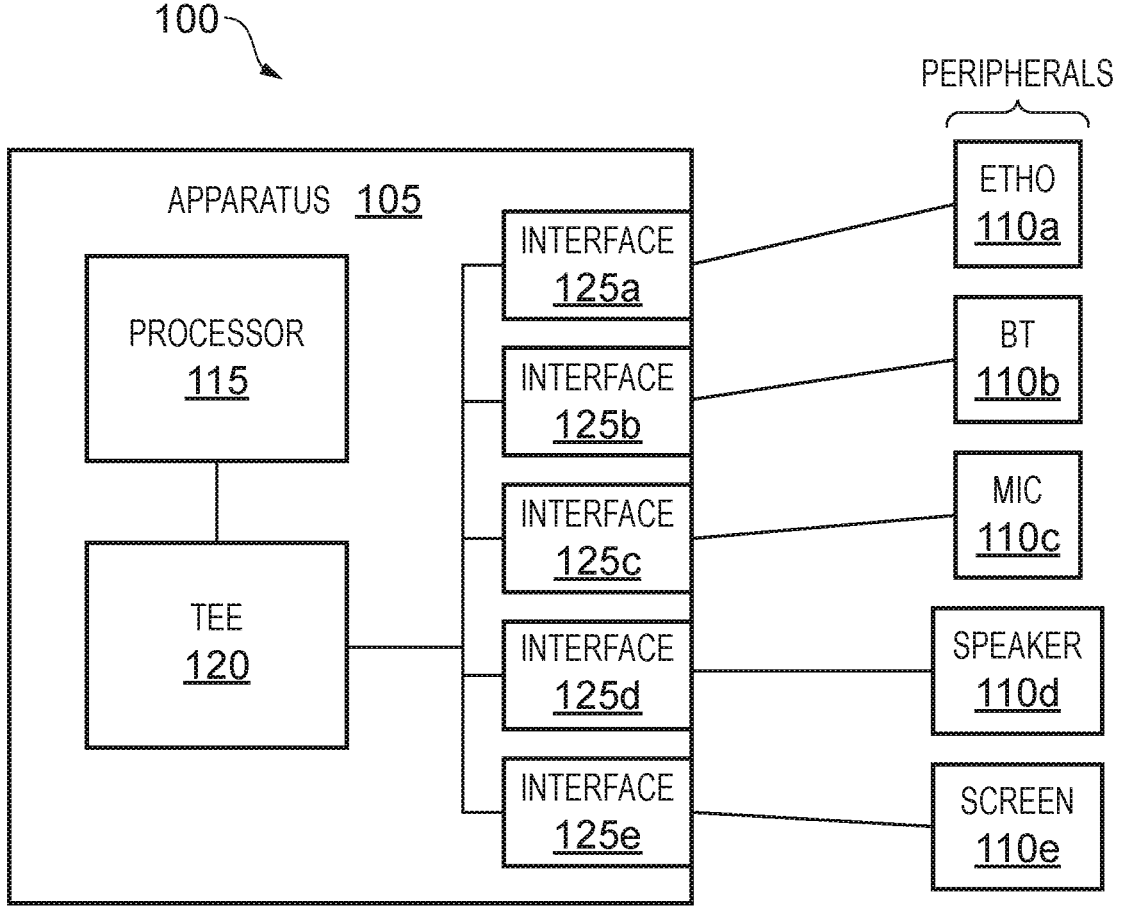
FIG. 1 shows schematically an apparatus according to example of the present disclosure.

As indicated above, in one example of the present disclosure, an apparatus comprises interface circuitry, processing circuitry and trusted execution environment (TEE) circuitry. The apparatus can thus be conceptually divided into a trusted portion (i.e. the TEE circuitry) and an untrusted portion (i.e. the processing circuitry and interface circuitry). The apparatus may for example be an Arm Trustzone enabled device. The interface circuitry is configured to interface with one or more peripheral devices, and the processing circuitry is configured to execute software to communicate with a given peripheral device of the one or more peripheral devices. The TEE circuitry is communicatively coupled between the interface circuitry and the processing circuitry. Communications between the processing circuitry and the peripheral devices are thus transmitted via the TEE circuitry and processing circuitry. The TEE may be configured such that all dataflow between the processing circuitry and the peripheral devices (or a subset of the peripheral devices) passes via the TEE, i.e. such that the interface circuitry is configured to communicate with the processing circuitry solely via the TEE circuitry. This provides assurance that the TEE will not be bypassed.

The TEE circuitry is configured to receive a transmission from one of the processing circuitry and the given peripheral device to the other one of the processing circuitry and the given peripheral device. The TEE circuitry then applies a control policy in respect of the received transmission and, based on the control policy, determine whether to forward the received transmission to said other one of the processing circuitry and the given peripheral device. Communications between the processing circuitry and the given peripheral device (in either direction) can thus be subject to the control policy applied by the TEE. The control policy may be application-specific (for example applying to a specific application or applications executed by the processing circuitry), or may apply to all communication between the processing circuitry and one or more peripheral devices. The policy may for example be written in a policy language.

This configuration provides a number of advantages over comparative systems in which no TEE is implemented and the control policy is implemented by an untrusted component of the apparatus (for example the processing circuitry). In particular, entities (including the processing circuitry, peripheral devices, and/or third parties) can have assurance that the control policy is correctly implemented. This may be imposed as a condition of use of the apparatus in an environment controlled by such a third party. For example, a user may be permitted to use their own device (e.g. smartphone, tablet, or laptop computer) in a secure premises provided that it can be proved that their device is implementing a control policy preventing the capturing of sensitive information (e.g. blocking access to a device camera and GPS circuitry whilst on premises, and/or restricting network access). Similarly, the present example may be used to implement parental controls over a child's device. The use of the TEE, as opposed to untrusted apparatus components, allows a third party such as an administrator or parent to trust that the control policy is in fact being implemented and will not be bypassed or deactivated. The use of the TEE also allows access to the control policy to be controlled and restricted, as described in more detail below.

As another example, the present example may be used to implement a hardware-based antivirus. In such an example, the given peripheral is network access circuitry, and the control policy defines characteristics of data which may or may not be permitted to be transmitted over the network, in order to block transmission of malware. For example, the policy may define a list of known malware signatures which are to be blocked. Similarly, the policy may define other types of data which are not permitted to be transmitted, such as illegal data or data which violates an employer usage policy.

The present example may further be used to control network dataflow, even where that dataflow is encrypted. This may be performed by provisioning the TEE circuitry with a cryptographic key associated with a secure communication channel via one of said peripherals. The TEE circuitry can thus decrypt network dataflow to apply a control policy based on the network dataflow content, whilst providing trust that the decrypted communication content will not be leaked outside the TEE circuitry.

The present example thus provides reliability of implementation of the control policy, in particular in a way which can be trusted by the parties to the communication as well as third parties.

The aforementioned trust may be provided by way of attestation. In one such example, the TEE circuitry is configured to perform an attestation process in respect of functionality to be performed by the TEE circuitry. The attestation process may be an attestation process in respect of the control policy. Alternatively or additionally, the attestation process may be performed in response to an attestation request received from relying party circuitry; the relying party circuitry optionally being one of the processing circuitry, one of said one or more peripheral devices, and a device external to the apparatus (such as one of the aforementioned third parties). The TEE circuitry can thus prove to an interested party, in a secure and trustworthy manner, that it is functioning as expected and in particular that it will implement the control policy.

In an example, performing the attestation process comprises transmitting, to the relying party, data indicative of said functionality. This may for example include a representation such as a hash or digest of computer program instructions to be performed by the TEE circuitry. As an example, this data may comprise data indicative of the control policy, such as a hash, digest or other representation thereof. The relying party can then verify the correctness of this data, for example by comparing it against a reference copy, or by providing it to an attestation service which verifies the authenticity of the data.

In examples, the control policy defines a permissibility of the transmission based on the content of the transmission. The control policy may for example define one or more actions which the transmission is permitted to direct the recipient (i.e. said other one of the processing circuitry and the given peripheral device) to perform. Alternatively or additionally, the control policy may define one or more actions which the transmission is not permitted to direct the recipient to perform. The control policy can thus restrict the instructions which may be sent to the peripheral device, and/or instructions which may be sent from the peripheral device to the processing circuitry, and thereby restrict the functionality of the peripheral device.

The TEE circuitry may be configured to update the control policy responsive to receipt of updated policy data. The control policy may define ways in which it may be updated (for example, updates may only be permitted at certain times, or they may be required to be received from certain sources). The continued integrity of the control policy can thus be assured.

Similarly, the TEE circuitry may be configured to implement an access control policy in respect of the control policy. The access control policy may define at least one of a condition which, when satisfied, indicates that modification of the control policy is permitted, and a condition which, when satisfied, indicates that modification of the control policy is forbidden.

One example of such a condition is that a current time is within a defined time window. It can thus be assured that the control policy will not be modified for the duration of time for which it is desired for it to be implemented. For example, in the example in which a user is permitted to use their own device to access a system provided that they can prove that their apparatus comprises a TEE configured to implement a control policy defined by the system administrator, the administrator may also impose an access control policy preventing modification of the control policy while the device is connected to the network. Another example of such a condition is that an entity, from which an access request is received, corresponds to an entry on a list defined by the access control policy. For example, the aforementioned administrator can be permitted to amend the control policy whilst the processing circuitry, controlled by the user, is not permitted to amend the control policy. The access control policy may also be subject to attestation as described above. These examples allow the administrator to trust that the user will not amend the control policy and thereby circumvent it.

Alternatively or additionally, the access control policy may define a condition which, when satisfied, indicates that reading of the control policy is forbidden. For example, it may be desirable to prevent the processing circuitry (and thus the user) from being aware of specific details of the control policy. As a specific example, an administrator may wish to prevent access to websites on a blocklist, or to prevent transmission of specific data such as illegal data defined in a blocklist, without informing the user of the actual contents of the blocklist.

As a further example, the access control policy may stipulate that approval is to be obtained from a user of the device prior to permitting modification of the control policy. The user can thus be assured that they remain aware of the control policies which have been implemented, and that they can prevent implementation of policies of which they do not approve (although this may mean that they are e.g. denied access to a system which requires such a policy to be implemented).

As a further access control example, the TEE circuitry may implement more than one control policy, each having been provided by a different entity. Access control may be applied such that each such entity can update or rescind its own control policy, but not the policies of other entities. In such an example, verification and/or precedence rules may be applied to ensure that such multiple policies do not interfere with each other, or to ensure that if multiple policies do interfere then there is a clear deterministic way to determine which policy to follow.

Methods may be provided for overriding the access control. For example, a factory reset of the apparatus may clear all control policies. Alternatively or additionally, higher priority (e.g. superuser) access may be provided. This allows restoration of a device if, for example, a control policy is implemented which renders the device non-functional (for example by denying access to all peripherals).

In an example, the control policy defines at least one of a peripheral device, of the one or more peripheral devices, which the transmission is permitted to define as the given peripheral device, and a peripheral device, of the one or more peripheral devices, which the transmission is not permitted to define as the given peripheral device. The control policy can thus define which peripherals the processing circuitry is permitted to communicate with, and which peripherals the processing circuitry is not permitted to communicate with. For example, access to a keyboard may be permitted, whilst access to a camera is denied.

In an example, the TEE circuitry is configured to, responsive to determining that the transmission violates the control policy, modify the transmission such that the control policy is satisfied. Communication between the processing circuitry and the given peripheral device can thus be facilitated as far as possible whilst ensuring the control policy is satisfied. Alternatively, the TEE circuitry may block transmissions which violate the control policy.

In an example, the TEE circuitry is configured to apply the control policy by applying a control policy function to transmissions between the processing circuitry and the given peripheral device. The TEE circuitry can thus efficiently implement the control policy by applying the same function (which may be a transform function) to all dataflow between the processing circuitry and the given peripheral device, without explicitly determining whether each transmission satisfies or violates the policy.

In an example, the apparatus comprises at least one non-secure peripheral device. In this example, the TEE circuitry is configured to not apply the control policy in respect of transmissions directed to said at least one non-secure peripheral device. Efficiency is thus improved by not analysing dataflow between the processing circuitry and the non-secure device. For example, the TEE may be unable to guarantee that it will not be bypassed for communications to the non-secure device (e.g. if the at least one non-secure peripheral device is communicatively coupled to the processing circuitry such that transmissions between the processing circuitry and the at least one non-secure peripheral device are not transmitted via the TEE circuitry). This may be implemented for peripherals for which it is not desired to impose control policies, such as an indicator light on apparatus.

In an example, the TEE circuitry implements a plurality of policy monitors (for example in software), such that each policy monitor is configured to apply the control policy in respect of a corresponding subset of the one or more peripheral devices. For example, a network access device may be subject to an entirely different control policy than a camera, and such different control policies can be efficiently implemented by distinct policy monitors.

Examples of the present disclosure will now be described with reference to the Figures. FIG. 1 shows schematically a system 100 according to an example of the present disclosure. The system 100 comprises an apparatus 105, which may for example be a computing device such as a computer, tablet, phone, or component thereof. The apparatus 105 communicates with peripherals 110a-110e. Specifically, in the example of FIG. 1, the peripherals comprise Ethernet circuitry 110a, Bluetooth circuitry 110b, a microphone 110c, a speaker 110d, and a screen 110e, but it will be appreciated that these are merely examples and other peripherals could be implemented.

The apparatus comprises a processor 115 to execute computer program instructions, some of which relate to communication with one or more peripherals 110a-110e. For example, the processor 115 may process network communications to be transmitted via the Ethernet circuitry 110a, as well as receiving inputs from the microphone 110c and outputting outputs to the speaker 110d. The apparatus 105 further comprises a trusted execution environment (TEE) 120 and interfaces 125a-125e for communicating with the peripherals 110a-110e The TEE 120 is communicatively coupled between the processor 115 and the interfaces 125a-125e, such that communications between the processor 115 and the interfaces 125a-125e are transmitted via the TEE 120. The TEE 120 is configured to apply a control policy in respect of these communications: based on the control policy, the TEE 120 determines whether to allow or block each such transmission. The control policy can thus control the ways in which the processor 115 is permitted to interact with the peripherals 110a-110e, for example by blocking access to certain peripherals, or selectively blocking dataflow (for example based on the content of individual transmissions).

Because the TEE 120 can by definition be trusted, including by third parties external to the system 100, such third parties can trust that the control policy will be correctly implemented. Conversely, if the control policy were implemented by the processor 115, such third parties would not be able to trust that the processor 115 was correctly implementing the control policy.

Figure 2A:
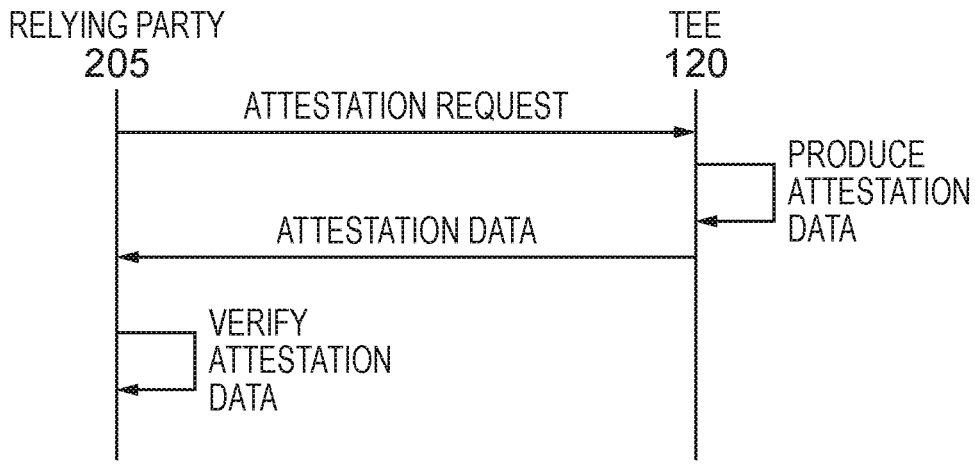
FIGS. 2A and 2B show example communication flows according to the present disclosure.

FIG. 2A illustrates an example communication flow by which a relying party 205 can verify that the TEE 120 of apparatus 105 is implementing the control policy. For example, the relying party 205 may be an administrator of a system which the processor 115 desires to access, and may impose a requirement that it must be proved that the TEE 120 is implementing the control policy before access is granted. As an example, the administrator may require certain peripherals (for example the microphone 110c) to be disabled, and may restrict the content of data which is transmitted via network peripherals (e.g. the Ethernet circuitry 110a).

The communications shown in FIG. 2A may be performed via a secure channel between the relying party 205 and the TEE 120. To initiate the process, the relying party 205 transmits an attestation request to the TEE 120. In response to this, the TEE 120 produces attestation data which is indicative of the control policy. For example, the attestation data may be a digest or hash of the control policy.

The TEE 120 then transmits the attestation data to the relying party 205. The relying party 205 verifies the attestation data, for example by comparing it against a reference copy, or by submitting it to an attestation service (which may, in one example, be provided by a manufacturer of the TEE 120). Having verified the attestation data, the relying party 205 can trust that the TEE 120 is implanting the control policy. The relying party 205 may then, for example, grant access to the aforementioned system.

Figure 2B:
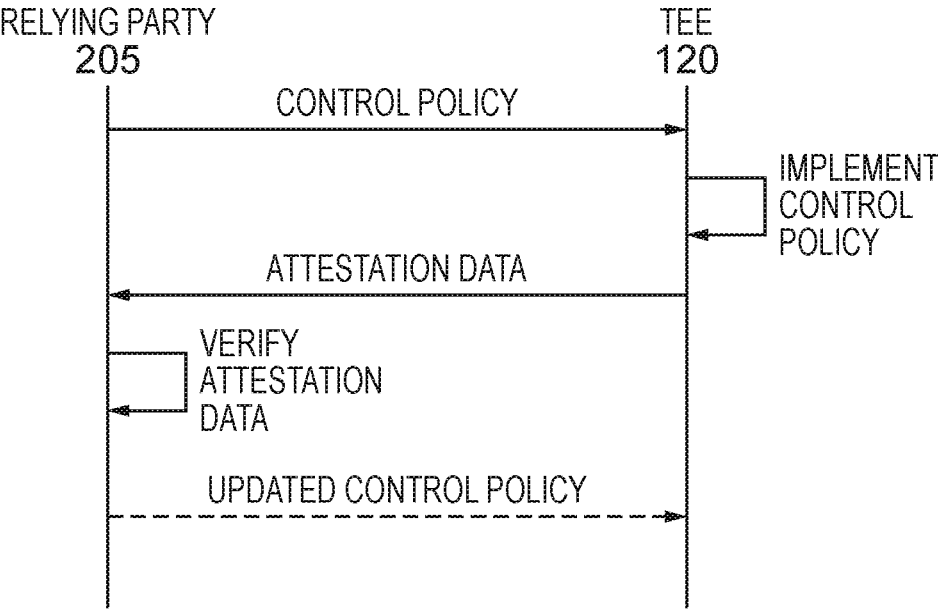

FIG. 2B illustrates an extension of the communication flow of FIG. 2A. In this example, the control policy is provided by the relying party 205. For example, where the relying party 205 is a system administrator as described above, it may provide the control policy to the TEE 120 as part of a log-in procedure.

The relying party 205 begins by transmitting the control policy to the TEE 120. The TEE 120 receives this, configures itself to implement the control policy, and transmits attestation data back to the relying party 205. As above, the attestation data may be a digest or hash of the control policy.

The relying party 205 then verifies the attestation data as in FIG. 2A.

Optionally, at a later time, the relying party 205 may transmit an updated control policy to the TEE 120. The above-described process may then repeat, to allow the relying party 205 to trust that the control policy has been correctly updated.

Figure 3:
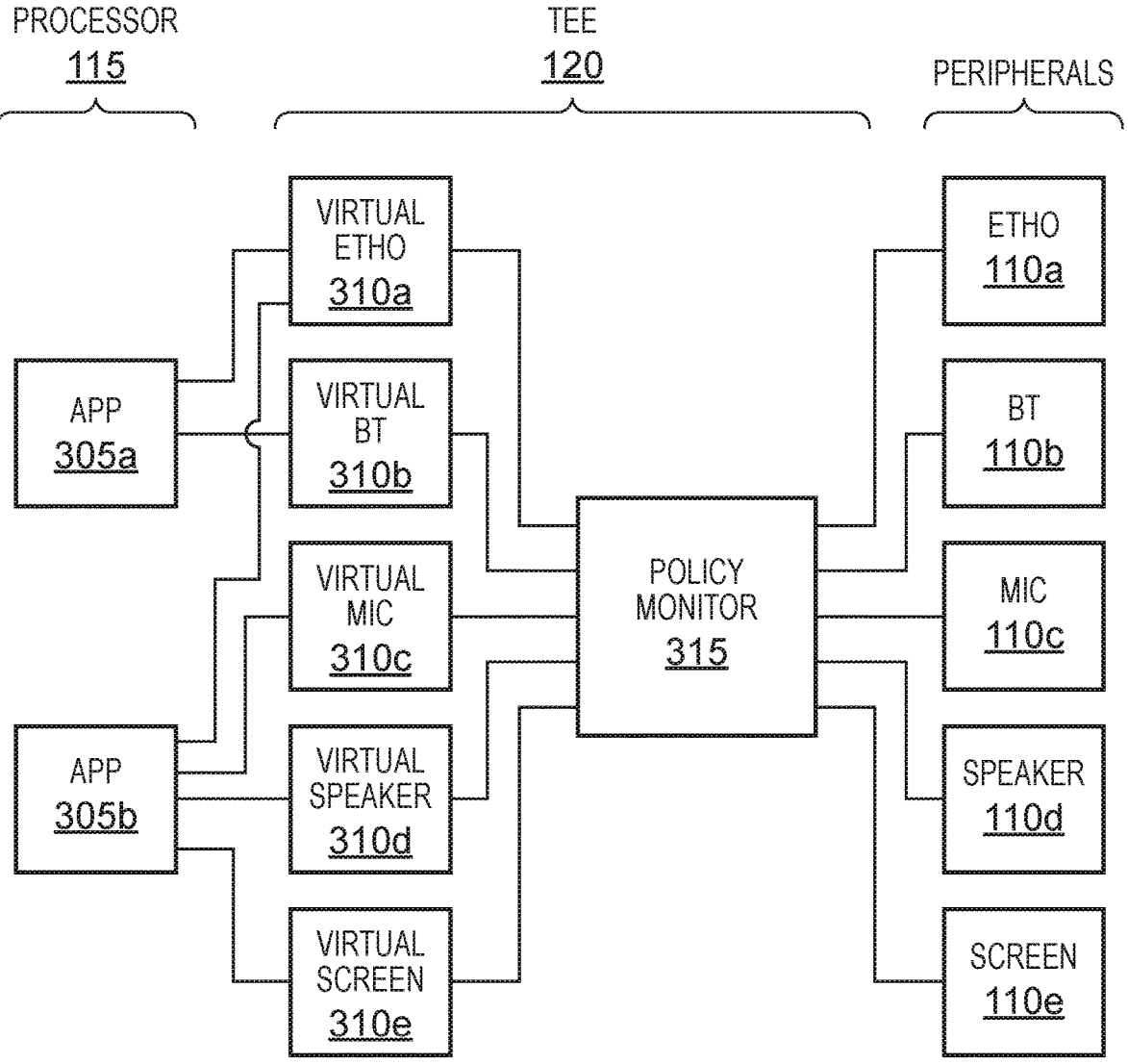
FIG. 3 shows schematically an apparatus according to an example of the present disclosure.

FIG. 3 schematically illustrates one way in which the system 100 of FIG. 1 can implement aspects of the present disclosure.

The processor 115 executes two user applications 305*a*, 305*b*. Each application is to communicate with a different set of peripherals: application 305*a* is to communicate with the Ethernet circuitry 110*a* and Bluetooth circuitry 110*b*, and application 305*b* is to communicate with the Ethernet circuitry 110*a*, microphone 110*c*, speaker 310*d* and screen 310*e*.

The TEE 120 implements a number of virtual interfaces 310*a*-310*e*, each corresponding to one of the peripherals 110*a*-110*e*. The virtual interfaces 310*a*-310*e* replicate the functionality of the physical interfaces 110*a*-110*e* such that the TEE 120 is transparent from the perspective of the processor 115.

The TEE further implements a policy monitor 315 which ingests dataflow directed to the peripherals 110*a*-110*e* and applies a control policy as described above. The policy monitor 315 is a trusted application, and only the policy monitor 315 has access to the peripherals 110*a*-110*e*. There is thus assurance that the policy monitor 315 cannot be bypassed and that the control policy will be implemented. An API may be provided to allow applications 115, 120 as well as external third parties to perform an attestation process in respect of the control policy, and/or query the currently running control policy, and/or update the control policy. The querying and/or updating of the policy may be restricted to certain authorised parties and may be mediated by an authentication process.

Figure 4:
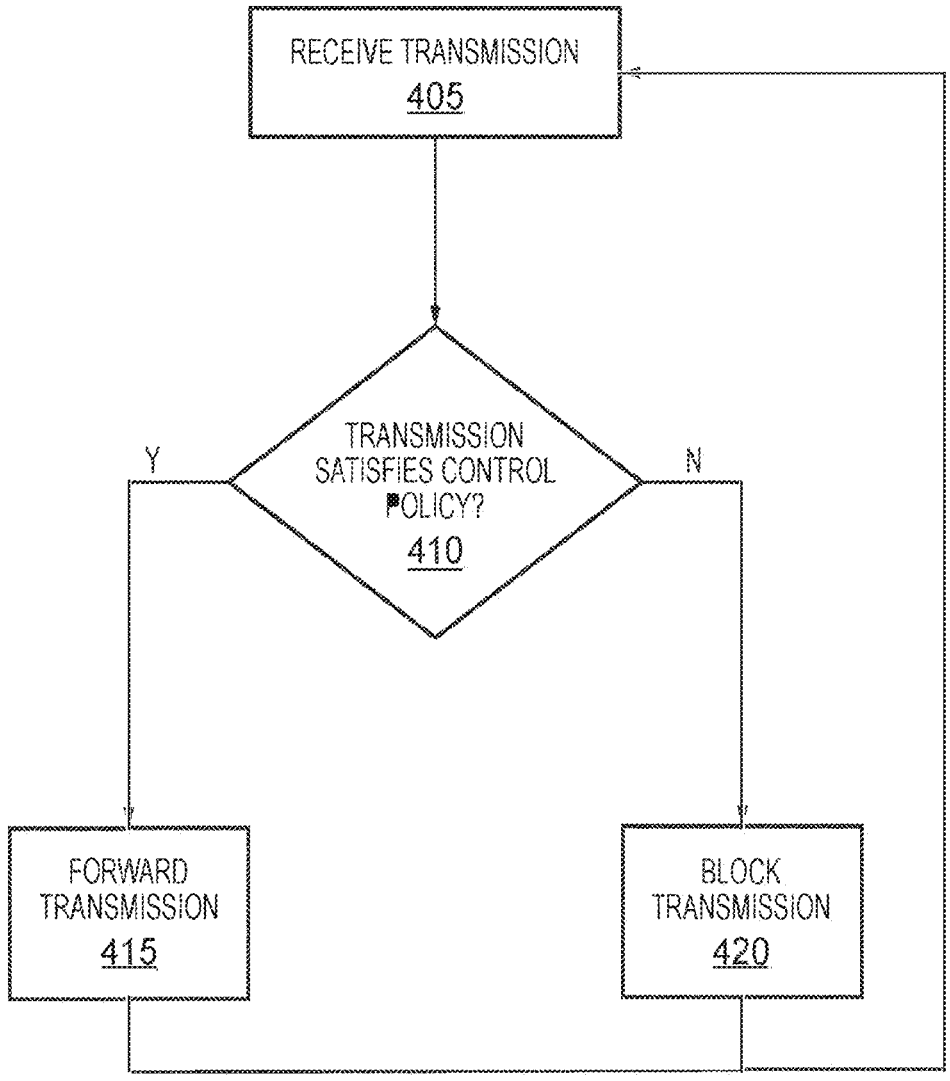
FIG. 4 depicts a method according to an example of the present disclosure.

FIG. 4 schematically represents a method according to examples of the present disclosure. The method is implemented by a TEE 120.

At block 405, a transmission is received. The transmission may be a transmission from a processor 115 to a peripheral 110*a*-110*e*, or vice-versa.

At block 410, it is determined whether the transmission satisfies a control policy.

If the transmission satisfies the control policy, flow proceeds to block 415, and the transmission is forwarded to its recipient. Conversely, if the transmission does not satisfy the control policy, flow proceeds to block 420 and the transmission is blocked.

Flow then returns to block 405, and a further transmission is received. Through use of the above described techniques, it will be appreciated that control policies can be implemented in respect of communication between a processor and peripherals, in a way that can be verified and trusted by the processor, peripherals, and/or third parties.

Methods described herein may be performed in hardware and/or software. Such hardware may be a general-purpose processor, or a more specific unit such as an application-specific integrated circuit or a field-programmable gate array.

Although illustrative examples of the invention have been described in detail herein with reference to the accompanying drawings, it is to be understood that the invention is not limited to those precise examples, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. An apparatus comprising:
   interface circuitry to interface with one or more peripheral devices;
   processing circuitry to execute software to communicate with a given peripheral device of the one or more peripheral devices; and
   trusted execution environment circuitry communicatively coupled to the interface circuitry and the processing circuitry, the trusted execution environment circuitry being configured to:
     receive a transmission from a source to a recipient, wherein:
       the source is the processing circuitry and the recipient is the given peripheral device, or
       the source is the given peripheral device and the recipient is the processing circuitry;
     apply a control policy in respect of the received transmission and, based on the control policy, determine whether to forward the received transmission to the recipient; and
     implement an access control policy in respect of the control policy, wherein the access control policy defines a condition which, when satisfied, indicates that reading of the control policy is forbidden,
   wherein:
   the trusted execution environment circuitry is configured to perform an attestation process in respect of functionality to be performed by the trusted execution environment circuitry in response to an attestation request received from a device external to the processing circuitry which the processing circuitry desires to access; and
   performing the attestation process comprises transmitting, to the device external to the processing circuitry, data indicative of said functionality.

2. The apparatus according to claim 1, wherein the attestation process is an attestation process in respect of the control policy.

3. The apparatus according to claim 1, wherein the trusted execution environment circuitry is configured to perform the attestation process in response to an attestation request received from relying party circuitry.

4. The apparatus according to claim 3, wherein the relying party circuitry is one of:
   the processing circuitry; and
   one of said one or more peripheral devices.

5. The apparatus according to claim 1, wherein the data indicative of said functionality comprises data indicative of the control policy.

6. The apparatus according to claim 1, wherein the control policy defines a permissibility of the transmission based on content of the transmission.

7. The apparatus according to claim 6, wherein the control policy defines, at least one of:
   an action which the transmission is permitted to direct the recipient to perform; and
   an action which the transmission is not permitted to direct the recipient to perform.

8. The apparatus according to claim 1, wherein the trusted execution environment circuitry is configured to update the control policy responsive to receipt of updated policy data.

9. The apparatus according to claim 1, wherein the access control policy defines at least one of:
   a condition which, when satisfied, indicates that modification of the control policy is permitted; and a condition which, when satisfied, indicates that modification of the control policy is forbidden.

10. The apparatus according to claim 9, wherein the condition is at least one of:

a current time being within a defined time window; and an entity, from which an access request is received, corresponds to an entry on a list defined by the access control policy.

11. The apparatus according to claim 1, wherein the access control policy stipulates that approval is to be obtained from a user of the device prior to permitting modification of the control policy.

12. The apparatus according to claim 1, wherein the control policy defines at least one of:

a peripheral device, of the one or more peripheral devices, which the transmission is permitted to define as the given peripheral device; and a peripheral device, of the one or more peripheral devices, which the transmission is not permitted to define as the given peripheral device.

13. The apparatus according to claim 1, wherein the trusted execution environment circuitry is configured to, responsive to determining that the transmission violates the control policy, perform one of:

modifying the transmission such that the control policy is satisfied; and blocking the transmission.

14. The apparatus according to claim 1, wherein the trusted execution environment circuitry is configured to apply the control policy by applying a control policy function to transmissions between the processing circuitry and the given peripheral device.

15. A method comprising:

receiving a transmission, from a source to a recipient, wherein:

the source is processing circuitry and the recipient is a peripheral device, or the source is the peripheral device and the recipient is the processing circuitry;

applying a control policy in respect of the received transmission;

based on the control policy, determining whether to forward the received transmission to the recipient; and implementing an access control policy in respect of the control policy, wherein the access control policy defines a condition which, when satisfied, indicates that reading of the control policy is forbidden; and performing, in response to an attestation request received from a device external to the processing circuitry which the processing circuitry desires to access, an attestation process in respect of functionality to be performed by the trusted execution environment, wherein performing the attestation process comprises transmitting, to the device external to the processing circuitry, data indicative of said functionality.

16. A system comprising:

the apparatus according to claim 1; and said one or more peripheral devices.

* * * * *